United States Patent
Bennett et al.

(10) Patent No.: US 6,490,574 B1
(45) Date of Patent: Dec. 3, 2002

(54) METHOD AND SYSTEM FOR MANAGING RULES AND EVENTS IN A MULTI-USER INTELLIGENT AGENT ENVIRONMENT

(75) Inventors: Robert B. Bennett, Endwell, NY (US); Andrew Coleman, Vestal, NY (US); Joseph M. Gdaniec, Vestal, NY (US); Janet E. Geddes, Endwell, NY (US); Wendy E. Stephens, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 08/992,091

(22) Filed: Dec. 17, 1997

(51) Int. Cl.[7] .................................... G06F 17/00
(52) U.S. Cl. ..................... 706/47; 706/46; 706/48
(58) Field of Search ..................... 395/704, 710, 395/712; 706/45, 47, 48, 46

(56) References Cited

U.S. PATENT DOCUMENTS

| | | | |
|---|---|---|---|
| 4,754,410 A | * 6/1988 | Leech et al. | 706/45 |
| 4,943,932 A | 7/1990 | Lark et al. | 706/60 |
| 5,140,671 A | 8/1992 | Hayes et al. | 706/60 |
| 5,159,685 A | * 10/1992 | Kung | 706/908 |
| 5,218,669 A | 6/1993 | Kobayashi et al. | 706/47 |
| 5,283,856 A | * 2/1994 | Gross et al. | 706/47 |
| 5,412,753 A | 5/1995 | Alston et al. | 706/11 |
| 5,446,874 A | 8/1995 | Waclawsky et al. | 714/712 |
| 5,506,955 A | 4/1996 | Chen et al. | 714/47 |
| 5,555,346 A | * 9/1996 | Gross et al. | 706/45 |
| 5,603,031 A | 2/1997 | White et al. | 345/683 |
| 5,778,155 A | * 7/1998 | Hepner | 706/47 |
| 5,832,467 A | * 11/1998 | Wavish | 706/13 |
| 6,085,183 A | * 7/2000 | Horn et al. | 706/45 |
| 6,182,059 B1 | * 1/2001 | Angotti et al. | 706/45 |
| 6,321,217 B1 | * 11/2001 | Maeda et al. | 706/47 |

FOREIGN PATENT DOCUMENTS

GB 2271004 A 3/1994

OTHER PUBLICATIONS

Muller, "Improving network operation with intelligent agents", Int. Jour. of Network Mgmt. vol. 7, pp. 116–126, 1997.*
Boone, "Concept features in Re agent an intelligent email agent", ACM Autonomous agents, pp. 141–148, 1998.*
Meech et al, "A multi agent system for personal messaging" National Research Council of Canada pp. 144–145, 2000.*

(List continued on next page.)

*Primary Examiner*—Anil Khatri
(74) *Attorney, Agent, or Firm*—RatnerPrestia; Arthur J. Samodovitz, Esq.

(57) ABSTRACT

A method and system for constructing rule-based intelligent agents that process events on behalf of one or more users. The intelligent agents have event-generating modules that supply events to be processed, and event-processing modules that process the events by evaluating rules. Each event-processing module of the agent includes multiple sets of rules, one or more such sets for each user of the agent. A selection key related to the user is associated with a rule set, and for event-generating modules a selection key indicates the user on whose behalf the event was generated. When the event-processing module receives an event with a selection key, the module locates and evaluates the rule set(s) which have a matching key to launch the corresponding actions. Addition, replacement or removal of rule sets for a user is made by temporarily suspending the initiation of new events for the user designated by the rule set's selection key; completing all in-progress events for that user; effecting the modification to the rule set within the event-processing modules; and the resuming the initiation and processing of events for the user. While the rule sets are being modified for a particular user, event generating and processing continues unimpeded for the other users of the agent.

26 Claims, 7 Drawing Sheets

OTHER PUBLICATIONS

Palumbo et al, "The operational semantics of an active message system", ACM pp. 367–375, 1992.*

Logan et al., "Modelling information retrieval agents with belief revision", ACM, pp. 91–100.*

Ovans and Havens, "Intelligent mediation an architecture for the real time allocation of interface resources", ACM IUI, pp. 55–61, 1992.*

IBM Tech. Disclosure Bulletin, vo. 37, No. 11, pp. 539–541, Nov. 1994.*

IBM Technical Disclosure Bulletin, "Rule–Based Dynamic Personal Variables", vol. 37, No. 11, Nov. 1994, pp. 539–541.

IBM Technical Disclosure Bulletin, "Dynamic Control of Intelligent Agent Rules" vol. 38, No. 04, Apr. 1995, pp. 541–542.

IBM Technical Disclosure Bulletin, "Method of Rule–Based File, Window, and Message Processing", vol. 38, No. 07, Jul. 1995, pp. 45–46.

* cited by examiner

METHOD AND SYSTEM FOR MANAGING RULES AND EVENTS IN A MULTI-USER INTELLIGENT AGENT ENVIRONMENT

TECHNICAL FIELD

The present invention relates to rule-based intelligent agent systems, and, in particular, to improvements for managing events and rule sets in multi-user intelligent agent environments.

BACKGROUND OF THE INVENTION

An intelligent agent is a specialized program which autonomously performs tasks on behalf of users based on instructions given to it by the users, and may also communicate and exchange data with other intelligent agents. One example of an intelligent agent program is called a personal assistant. Personal assistant programs, which often use rule-based forms of instructions, are quickly becoming the state-of-the-art method for automatically performing tasks on the workstation, particularly in an office environment.

Personal assistant programs offer the user a particular set of events which the personal assistant can automate, conditions to be evaluated about the events, and actions to be taken based Qn the events and conditions. The events specify occurrences of events in an office environment designated by the user, such as the point in time when the user receives an electronic mail item. The conditions are related criteria at the time the event occurs, such as a certain time of day or from whom the electronic mail was sent. The actions are the functions designated by the user to occur automatically when the event occurs under the stated conditions.

For example, a personal assistant may process three types of events:

1. Mail: When mail arrives
2. Time: At a specific time
3. File: If file manipulation occurs.

Table 1 shows events, conditions, and action elements offered by an exemplary personal assistant program which performs mail manipulation:

TABLE 1

Instruction Book - TestBook
Instruction Edit Tools Parts options Help
Name: Mail Instruction 1

| Event | Conditions | Actions |
| --- | --- | --- |
| New Mail | Contains Keyword | Move to Folder |
| Time Alarm | When Time | Look for Overdue Mail |

As shown in Table 1, a user has defined two events: "New Mail" and "Time Alarm." The entries of the "Conditions" column are the criteria under which the personal assistant program is to take an action on the event, such as looking for a certain string of characters, "keyword," in the text of a received mail item, and/or starting an action at a certain time "time." The "Actions" column indicates the action that the program must take once the specified set of conditions is satisfied, such as transferring a mail item to a particular mail folder and/or scanning the user's existing mail to generate reminders for overdue mail items.

The user selects events, conditions, and actions to be used in building a rule, then the user connects these elements appropriately. Rules can be built to execute all actions if any condition is met, all actions only if all conditions are met, or ordered actions if select criteria are met. Only certain conditions and certain actions can be associated with each event.

Continuing with the example, a typical rule may be defined with the elements shown in Table 2:

TABLE 2

Instruction Book - TestBook
Instruction Edit Tools Parts options Help
Name: Mail Instruction 1

| Event | Conditions | Actions |
| --- | --- | --- |
| New Mail | Contains Keyword = "For Sale" | Move To Folder = "Junk Mail" |

This rule causes the following to occur: if a new mail item arrives and the text of the mail item contains the phrase "For Sale", the mail item is moved into he "Junk mail" folder.

A user may define a personal variable to be used in rules. For example, the user might define the term "mgr" to be set to the value "Joe", then a rule can be built to send a file to the "%mgr%" folder, which would cause the mail to be sent to the "Joe" folder. Therefore, instead of changing all the rules which refer to Joe, only the definition of the personal variable "mgr" needs to be changed.

A user may also be able to dynamically assign values to personal variables in a rule. This feature may be useful for such tasks as registering applications for use in other rules, even if the name of the application is not known at the time the rule is built, but becomes known when a particular rule fires.

The example personal assistant has been described above as operates on behalf of a single user. However, intelligent agents may operate on behalf of multiple users simultaneously, such as in a server system shared by the users. In such multi-user environments an additional degree of complexity is added since the rules used by the intelligent agent can be defined and changed by each of the agent's users. Consequently, the system must keep track of on whose behalf it is processing a particular event and use the correct rule sets for processing of that user's events. Moreover, the system must also allow modifications to one user's rule sets while the intelligent agents is processing events for other users.

SUMMARY OF THE INVENTION

The present invention relates to a method and apparatus which operates a rule-based intelligent agent to process events occurring in a computer system on behalf of a group of users. The method and apparatus 1) receive at least one event set and rule set for each of the group of users; 2) associate, with each event set and each rule set, a respective selection key which identifies the rule set and the event set with the respective user; 3) monitor the computer system to detect an occurrence of an event condition, the detected event condition corresponding to an event specified in at least one of the received event sets; 4) assign at least one selection key to the detected event condition, each assigned selection key corresponding to the at least one specified event of the received event sets; and 5) processing the detected event condition using at least one rule set having a respective selection key which matches the selection key assigned to the event condition.

BRIEF DESCRIPTION OF THE DRAWING

The invention is best understood from the following detailed description when read in connection with the accompanying drawings.

DETAILED DESCRIPTION OF THE INVENTION

Figure 1:
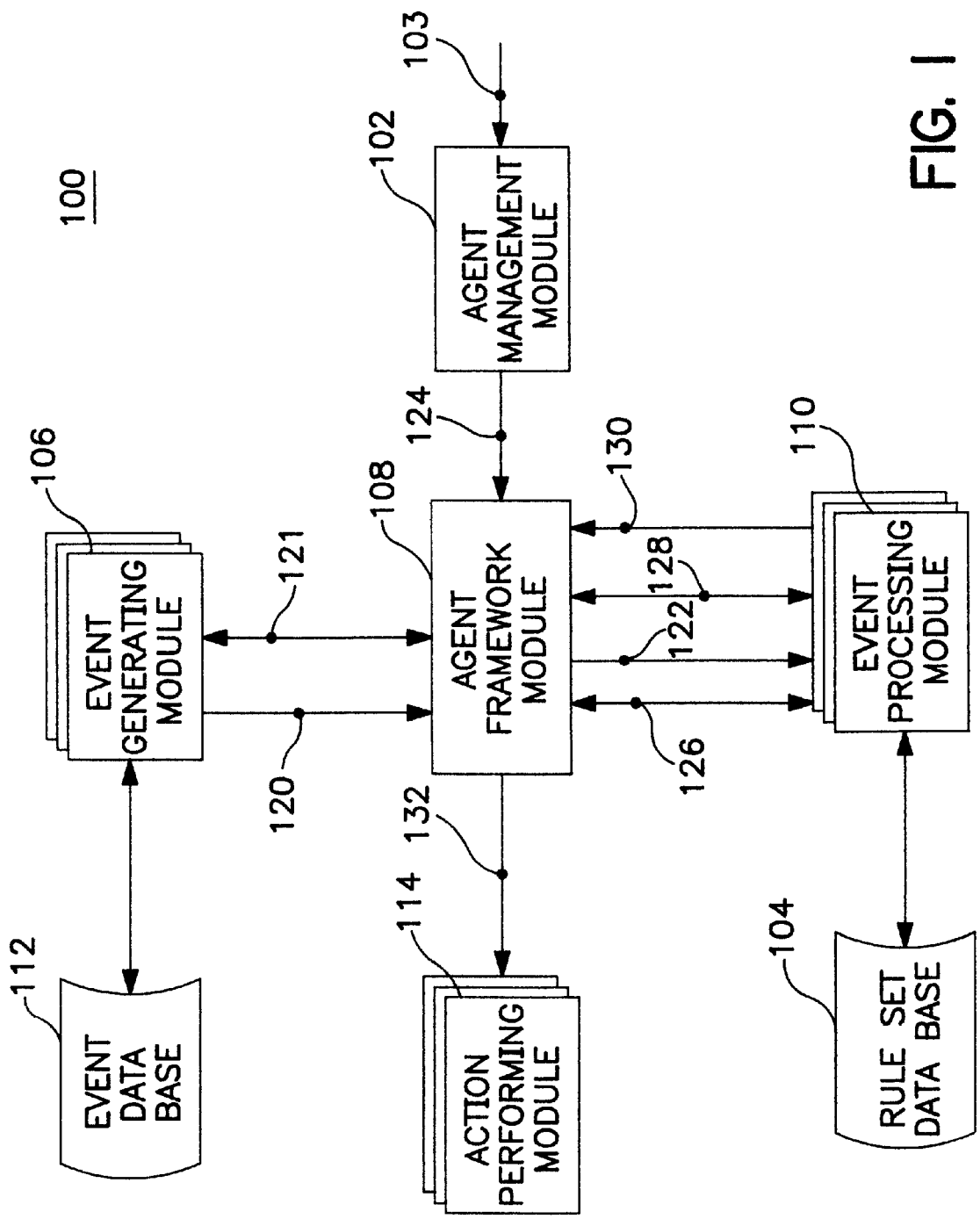
FIG. 1 is a block diagram depicting a data processing system which includes an exemplary embodiment of the present invention.

A method and apparatus constructs event-processing intelligent agents which concurrently process events on behalf of more than one user while also permitting each user to specify the events to be processed, conditions to be evaluated and actions to be taken independently of event processing specified by other users. Such intelligent agents may also process events on behalf of a single user as a simplified case. The present invention may be used in conjunction with intelligent agents of the prior art in which: (1) event-generating components detect the occurrence of events of interest to the users of the agent and supply indications of those events to be processed; and (2) event-processing components receive those event indications and process the events by means of evaluating rules or other similar forms of instructions.

According to the present invention, an event-processing component of the agent is permitted to have multiple sets of rules, one or more such rule sets per user of the agent. These rule sets are managed within the event-processing component by associating each rule set with a selection key. This key may be the identity of the user who "owns" or who created the rule set. Similarly, each of the event-generating components may be requested to generate events on behalf of any or all of the users of the agent. These requests are managed within the event-generating components by associating, with each event generation request, the identifying selection key. The selection key may be associated with the identity of the user who requested the events and is the same value as that associated with the user's rules. When an event-generating component of the agent generates an event, it includes, in an associated event record, the selection key identifying the user on whose behalf the event is being generated. The event-processing component then selects the appropriate rule set to process each event based on having a selection key that matches the value of the selection key in the event record. Then the event is processed using those rules.

Often, configuration data used by the event-generating components is logically related to the rules used by the event-processing components of the intelligent agent. Consequently, changes to configuration data and to rules within rule sets must be synchronized and coordinated to prevent the intelligent agent from taking undesirable actions. The present invention provides for coordinated addition, replacement or removal of event-configuration information and rule sets for a particular user while event processing continues in the agent for other users.

According to the present invention, coordination between the event-generating components and the event-processing components is provided by suspending the generation and processing of events on behalf of an affected user, effecting a change in event-generation information and event-processing rules for that user, and then resuming the generation and processing of events for the user. Event generation and processing is suspended only for the affected user; the intelligent agent may continue unimpeded to generate and process events for other users.

FIG. 1 is a block diagram depicting an exemplary embodiment of intelligent agent processing system 100 according to the present invention. As shown, the system 100 includes an agent management module 102, one or more event generating modules 106, an agent framework module 108, one or more event processing modules 110, one or more action performing modules 114, a rule set database 104 and an event database 112.

Agent management module 102 provides an interface through connection 103 to users of the system 100 for communicating instructions or user data to the elements of system 100. An example of such communication is when each user programs the system 100 to perform a set of event-related tasks on the behalf of the user. Agent management module 102, supports communication with, and the performing of event-related tasks for, multiple users simultaneously such that the intelligent agent processing system 100 may support multiple users.

Agent management module 102 receives, over interface 103, instructions from each user related to processing of events on behalf of the user by the system 100. These instructions may include an explicit or implicit identification of the user, and a specification of the kinds of events considered as signals which trigger the performing of specific tasks. The instructions may also specify additional conditions, if required, which may be evaluated before performing an action related to the event, and what actions should be taken when those conditions are satisfied for the event. As is known in the art, these instructions may be supplied by the user using a graphical user interface, or may be supplied via network communication, or in any other way convenient to the particular embodiment of the agent management module 102.

The instructions received by the agent management module 102 are transformed into two sets of data and then provided to the agent framework 108 as a change request by signals over line 124. A first set of data is used to configure the event generation modules 106 in order to generate requested events, and a second set of data is used to configure the event processing modules 110 to process the events. Because the first and second sets of data are logically interrelated, the process of changing each first and second data set used for a user is preferably coordinated with the generation and processing of events. The coordination function performed by the agent framework 108 is described in detail below.

The set of first data used to configure event generating modules 106 includes an identifier related to the user on whose behalf the event is to be generated (user ID) and also a specification of the events to be generated. For example, this first set of data, configuration data, may include a specification to generate an event on behalf of user Alice at 12:00AM on each day. This configuration data is transferred by configuration signals over line 121 to the event generating modules 106 and is subsequently retained for use. The configuration data may be stored in an event database 112.

The second set of data which configures the event processing modules 110 to specify how the generated events are processed, may take the form of collections of rules, called rule sets. Rule sets include algorithms used to process data of the generated events in order to provide event actions. The rule sets also include the identifier, user ID, related to the user who specified the rule set. Rule sets of the second set of data are communicated to the event processing modules 110 by rule set modification signals over line 126. The communicated rule sets are subsequently retained for use by the event processing modules 110, and may be stored in a rule set database 104.

Each one of the event generation modules 106 of system 100 monitors conditions and data within an environment of the data processing system including the present invention in order to detect changes that are indicative of the occurrence of an event that system 100 is to process on behalf of a user. Often, a particular event generation module 106 monitors the data and state of the data processing environment related to a particular domain. For example, the module 106 may mass monitor an electronic mail system for the arrival of new mail, a database or file system for changes to the data contained therein, or a current time of day for the occurrence of a particular time. However, the present invention does not require such specialization, and a particular event generation module 106 may monitor the system for arbitrary state or data changes.

Each one of the action performing modules 114 is capable of performing certain desirable actions such as presenting a dialogue box to a user on a graphical user interface, or paging a person using an electronic paging system. Each one of the action performing modules 114 performs these actions responsive to signals received over line 132 from the agent framework 108, these signals being sent by the agent framework 108 response to perform action signals the agent framework 108 receives over line 130 from event processing modules 110. In a manner similar to that described for the event generation modules, such action performing modules 114 may be specialized to perform a set of related actions, but such specialization is not required for the present invention. Further, it is often the case that an action performing module 114 is logically related to a corresponding event generating module 106 in that both of these modules provide function related to the same domain, such as monitoring an e-mail system for new mail and taking actions on mail contained in that e-mail system. These pairs of related action performing and event generating modules may communicate with each other, accordingly one possible kind of action provided by the action performing module is to alter the state of the corresponding event generating module so as to cause a new event to occur, or to change the configuration information used by the event generating module to generate future events. In this way, the system 100 may allow rules to configure its future behavior.

The operation of the intelligent agent processing system 100 is now described. An event generating module 106 receives the configuration signals from the agent framework 108 indicating which ones of the possible events are currently of significance to users of the system 100. Upon detection of a change of significance to the system 100 as requested by the data of the configuration signals, the event generation module 106 generates a record of an event and supplies this event record to the agent framework 108 by a new event signal on line 120 connected to the agent framework 108. The event record includes event data values, an event identifier (event ID) and a selection key, which may be the user ID that is related to the user on whose behalf the event is being generated.

Agent framework 108 receives event records and the associated event data from event generation modules 106 and forwards those event records to one or more event processing modules 110 through communication line 122. The agent framework 108 may forward each event record to all event processing modules 110, or it may use event data or other means to select particular event processing modules 110 to which it forwards the event records.

Event processing module 110 receives the event record, including event data values, the event ID and the selection key generated by the event generation modules. The event processing module 110 processes events based on the event IDs, the selection key and on conditions and action specifications contained within the rule set database 104. Upon receipt of an event record, the event processing module 110 obtains one or more rule sets associated with the selection key and possibly also the event ID from the rule set database 104. These rule sets include algorithms and defined actions employed by the event-processing module 110 to determine the actions desired by the user as the response for the particular generated event.

When an event processing module 110 has determined the actions desired by the user for the particular generated event, the event processing module 110 requests those actions by sending perform action signals to the agent framework 108, which in turn forwards these action requests to appropriate ones of the action performing module 114 capable of performing the requested action.

Figure 2:
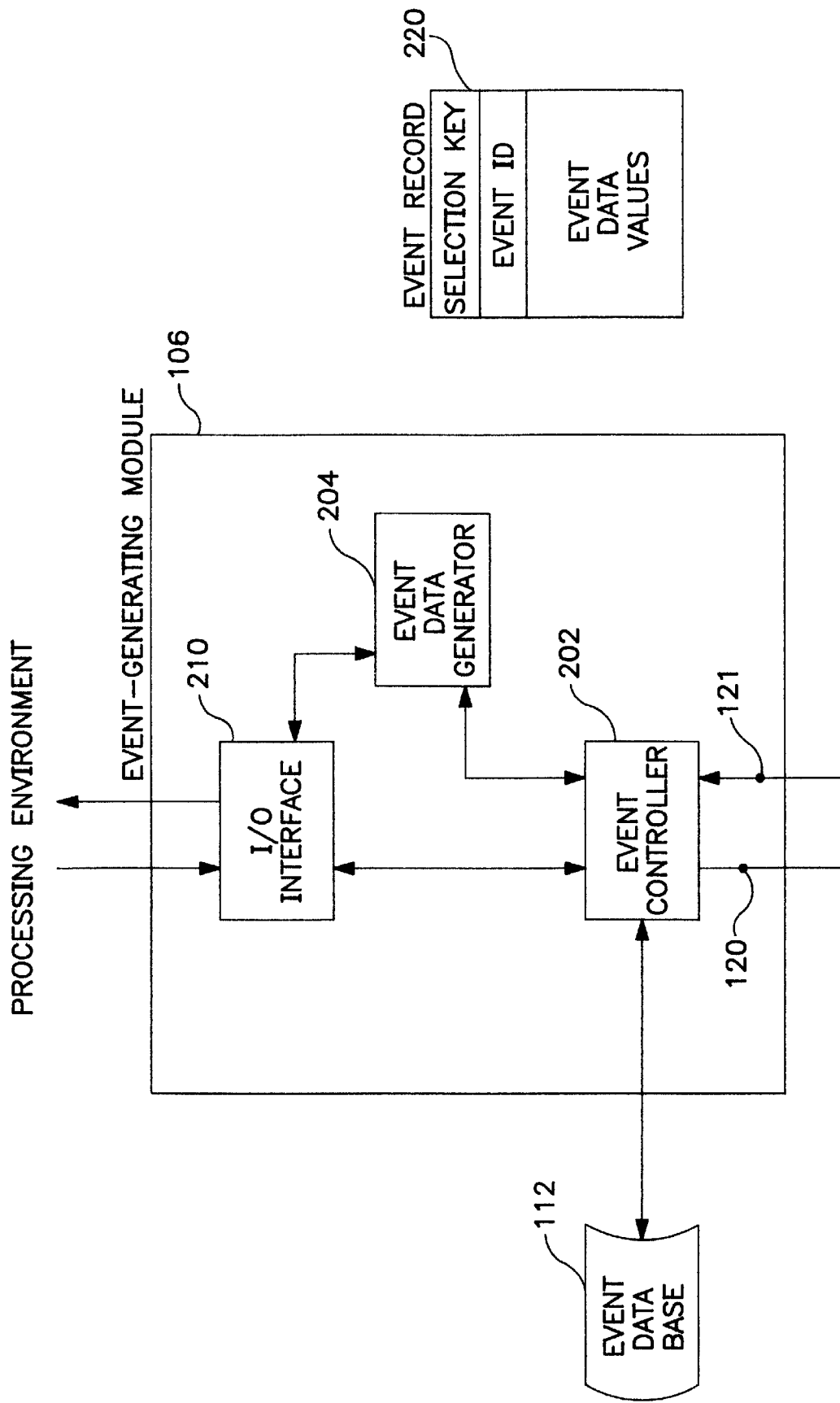
FIG. 2 is a block diagram depicting an event generating module suitable for use with the exemplary embodiment of the present invention shown in FIG. 1.

FIG. 2 is a block diagram illustrating an event generating module 106 suitable for use with the exemplary embodiment of the present invention shown in FIG. 1. Event generation module 106 includes event controller 202, event data generator 204, and I/O interface 210. The event controller 202 receives, over line 121, the configuration signals from the agent framework 108. These configuration signals specify which events, of the set of events that the event module is capable of generating, should be generated and a user identifier (user ID) representing the user on whose behalf those events should be generated. For example, an event generating module that is associated with time-of-day monitoring may receive a signal to generate an event on behalf of user Alice at 12:00AM every day. Responsive to these configuration signals, the event controller 202 records this configuration information, including the user ID, in the event database 112 and programs the I/O interface 210 to monitor for the occurrence of the condition which gives rise to the event.

The event controller 202 also receives, over line 121, quiesce and resume signals from the agent framework 108. A quiesce signal indicates that the event processing module 106 should temporarily suspend the generating of events for a particular user as identified by a user ID included with the quiesce signal. A resume signal indicates that the event processing module 106 should resume the generation of events for a particular user identified by user ID in the resume signal, using the configuration information it currently has recorded for that user. Upon receipt of such quiesce or resume signals, the event controller 202 modifies the event database 112 to indicate that events are either suspended or allowed for the user, as appropriate based on the signals received.

As programmed by the event controller 210, I/O interface 210 receives data from the data processing environment, which may be, for example, an indication of the receipt of e-mail, the occurrence of a particular time of day, the modification of a file or database, or any other similar event or occurrence. The means by which the I/O interface 210 receives data indicative of the occurrence of the event may vary depending on the type of occurrence being monitored. For example, in order to monitor for the receipt of e-mail, the I/O interface 210 may attach to, and receive signals from an e-mail system. As another example, in order to detect the occurrence of a particular time of day, the I/O interface 210 may monitor for the receipt of an alarm signal from the processing environment.

When I/O interface 210 determines that one of the requested events has occurred, it provides the event data to event controller 202. The controller 202 then performs a lookup in the event database 112 to determine if the given event constitutes a particular event requested by a user of the system 100 and, if the particular event is requested, the user ID of the user who is associated with event data. The event controller 206 also obtains from the event database 112 an indication of whether events are currently allowed for the associated user, or if they are currently suspended. If the event controller 202 determines that the event is one requested by a user and that events are not currently suspended for that user, the event data generator 204 creates the event record 220 including the event data values and event ID. The event controller 202 sets the selection key in the event record 220 to the value of the user ID associated with the user on whose behalf the event is being generated. Once the event record 220 is created, the event controller provides the event record 220 to the agent framework 108 by means of a new-event signal over line 120.

Figure 3A:
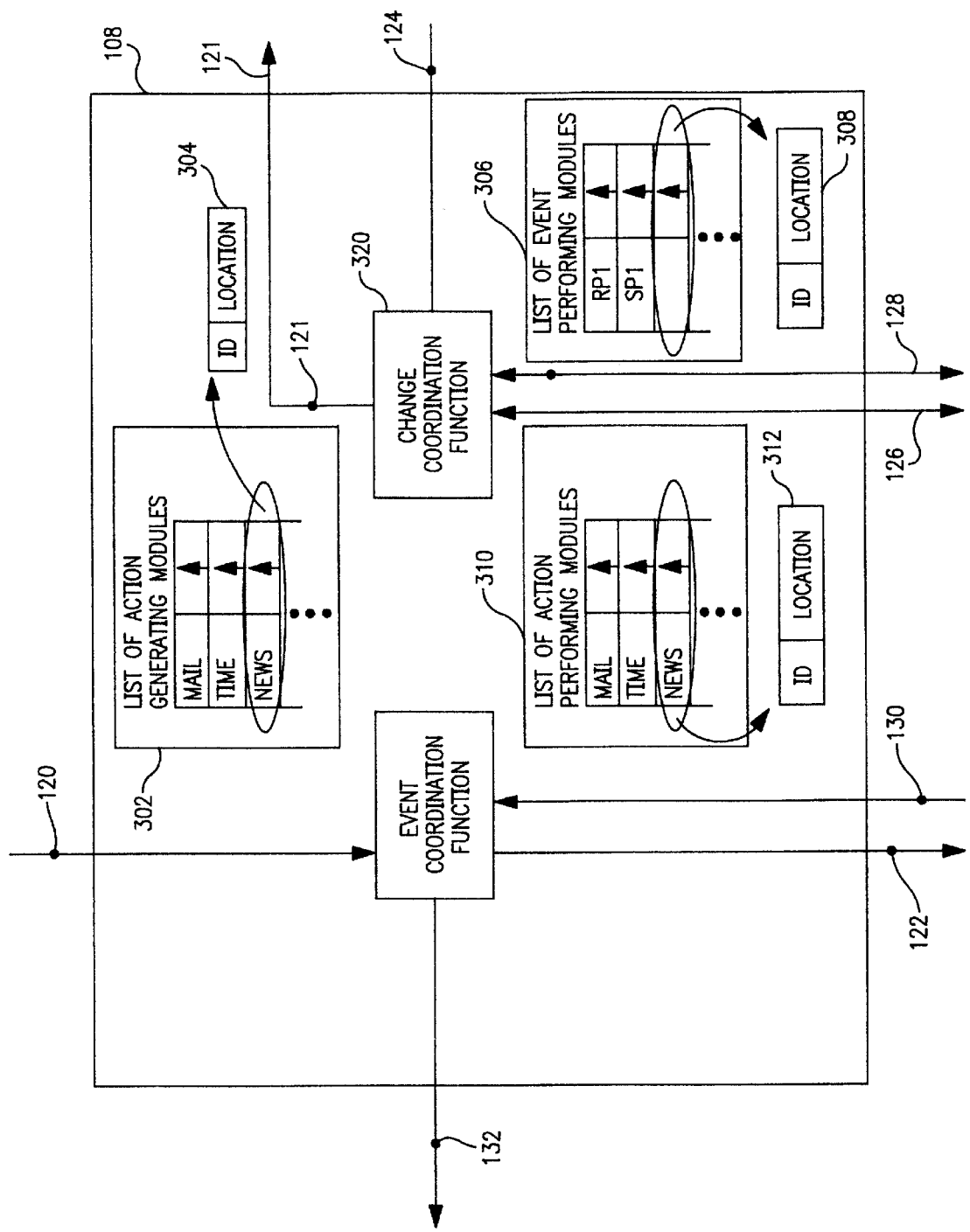
FIG. 3A is a block diagram depicting an agent framework module suitable for use with the exemplary embodiment of the present invention shown in FIG. 1.

FIG. 3A is a block diagram depicting an agent framework of the exemplary embodiment of the present invention shown in FIG. 1. Agent framework 108 includes an event generator (EG) list 302 of the event generating modules 106 present in the system 100, and an event processor (EP) list 306 of the event processing modules 110 present in the system 100. An entry 304 in the EG list 302 includes an identifier of the event generating module to which the entry corresponds, and information used to locate the event generating module, such as an address in memory. The entry 302 may also include information specifying which event processing module or modules 110 are to process the events generated by the event generating module 106 corresponding to the entry 302. In a similar manner, an entry 308 in the EP list 306 includes an identifier of the event processing module to which the entry 308 corresponds and information used to locate the event processing module, such as an address in memory.

Responsive to the receipt from line 120 of a new-event signal from an event generating module 106, the agent framework 108 receives the event record for the event from signal from line 120 and determines which event processing modules 110 are to process the event. The agent framework 108 may use the event ID and event data values from the event record, or other information, to determine which particular ones of event processing modules 110 are assigned to process the event. For each assigned event processing module, the agent framework 108 performs a lookup in the list 306 of event processing modules present in the system to locate the entry 308 for each particular event processing module 110 and uses the information of the corresponding entry 308 to locate the assigned event processing modules 110. The agent framework 108 provides a copy of the event record, including the selection key, to the assigned event processing modules 110 by sending a process-event signal to line 122.

The agent framework 108 also includes, in addition to the elements previously described, a list 310 of the action performing modules present in the system 100. Each entry 312 of this list includes some identifier of the action performing module and also its location in memory.

Figure 4:
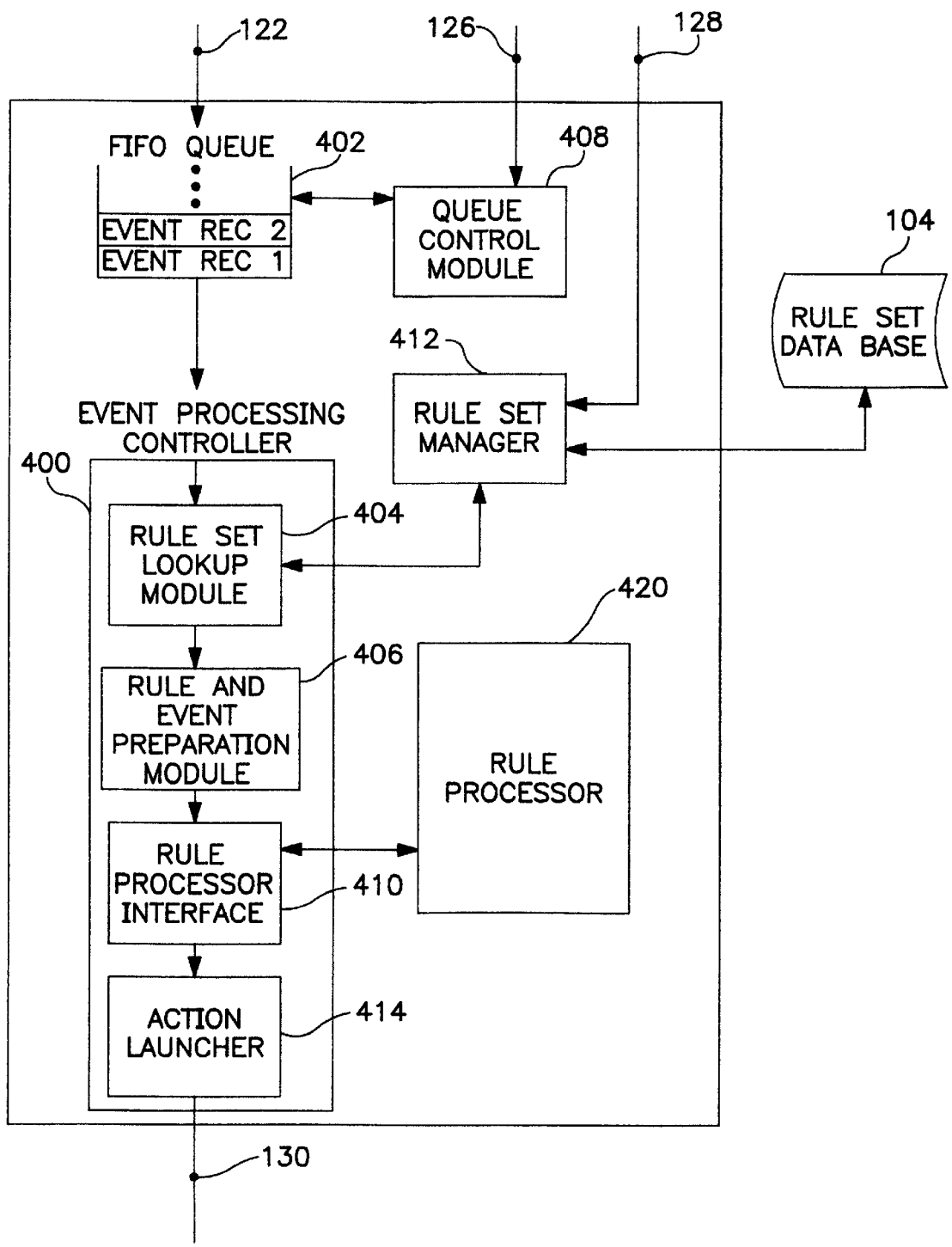
FIG. 4 is a block diagram depicting an event processing module suitable for use with the exemplary embodiment of the present invention shown in FIG. 1.

FIG. 4 is a block diagram illustrating an event processing module 110 suitable for use with the exemplary embodiment of the present invention shown in FIG. 1. The event processing module 110 includes an event processing controller 400, input buffer (a FIFO queue, for example) 402, a rule set manager 412, and a rule processor 420. The event processing controller 400 includes a rule-lookup module 404, a rules and event data association module 406, and a rule processor interface 410.

Input buffer 402 receives event records 220 generated by event generation modules 106 as forwarded by the agent framework 108. Event processing controller 400 takes each event record from the input buffer 402 and coordinates the processing of each event in turn. For each event, the rule-lookup module 404 receives the selection key from the event record 220 and passes that key as a retrieval key in a request to the rule set manager 412 to retrieve all of the rule sets associated with that key. Since the event-generating module 106 specifies the selection key as the user ID associated with the user on whose behalf the event was generated, and the rule set manager 412 associates the same user ID with each rule set specified by that user, the result of this request to the rule set manager 412 are those rule sets that were specified by the user on behalf of whom the event is being processed. Optionally, the rule lookup module 404 may further select from this collection of rule set based on the event ID or other data in the event record.

Figure 5:
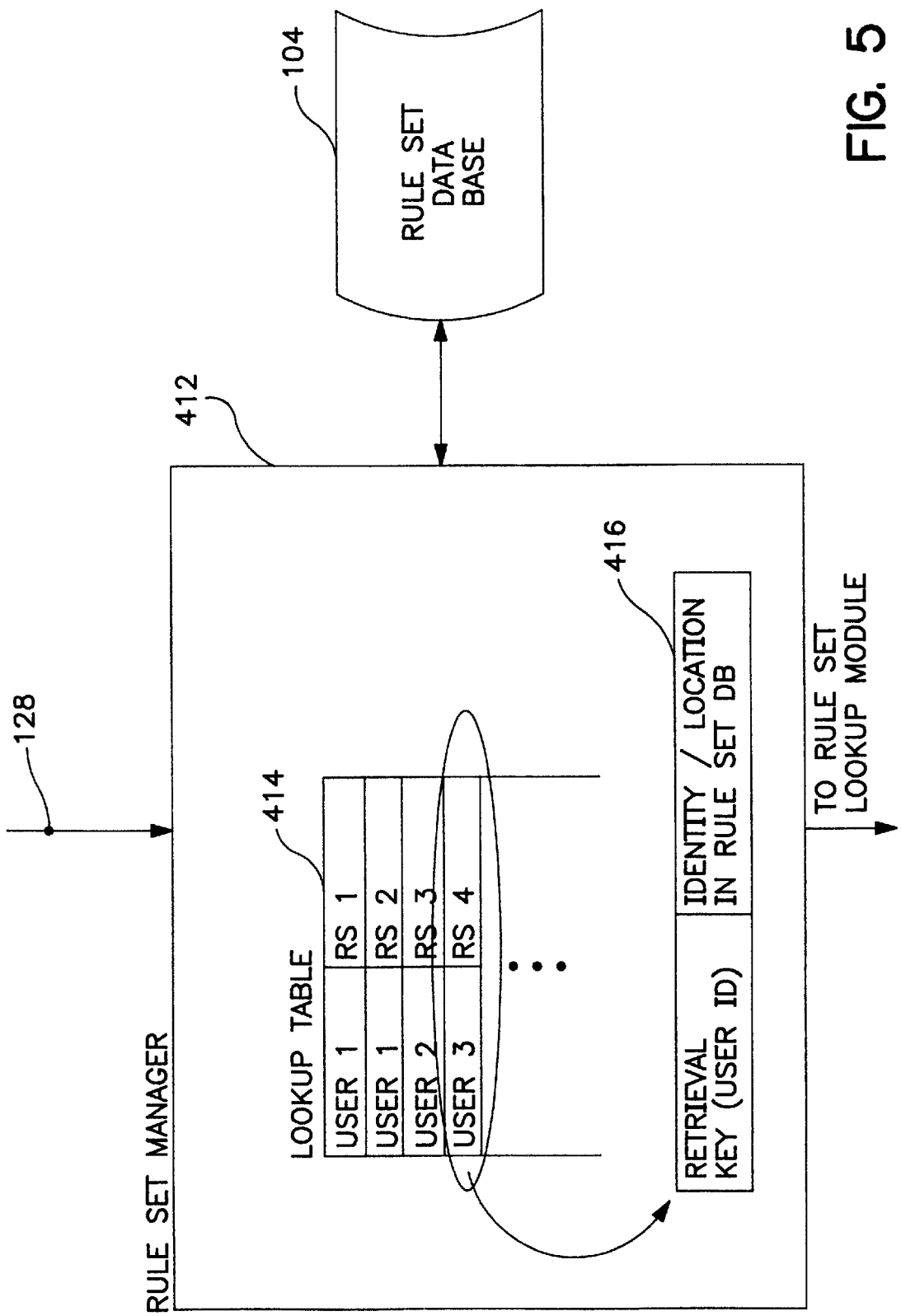
FIG. 5 is a block diagram depicting the rule set manager module as employed within the event processing module of the exemplary embodiment of the present invention shown in FIG. 4.

FIG. 5 is a block diagram illustrating the rule set manager 412 within the event processing module 110 shown in FIG. 4. The rule set manager 412 receives over line 128 rule set modification signals from the agent framework 108 that specify the addition, modification, or deletion of rule sets to be used by the event processing module. As described earlier, these rule sets describe the algorithms used in processing the data of the generated events in order to provide the event actions. In addition to the rule set data itself, the rule set modification signals include a user identifier (user ID) representing the user for which the rule sets describe the desired processing actions. For example, the rule sets for user Alice may describe that she wishes to be alerted when a high priority electronic mail item is received.

Responsive to these rule set modification signals, the rule set manager 412 stores, changes, or deletes the rule sets from the rule set database 104 as appropriate. In addition, the rule set manager 412 maintains a lookup table 414 that associates the user ID specified in the rule set modification signals with the rule set data provided in those signals and stored in the rule set database 104. Each entry 416 of this lookup table contains the user ID that serves as the retrieval key, along with other information necessary to locate the rule set in the rule set database 104. When the rule set manager 412 receives a request to add a new rule set for processing of events for a particular user, it uses this information to add an entry to its lookup table 414. This entry indicates that the rule set specified in the signal should be used to process events that are associated with the specified user ID.

In similar manner, agent framework 108 may signal the rule set manager 412 to stop using a rule set for the processing of events (i.e. to delete a rule set). When the agent framework 108 signals the rule set manager 412 for this purpose, an exemplary signal may include the identity of the rule set which should no longer be used, as well as the selection key that was previously associated with the rule set. The rule set manager 412 uses this information to remove any corresponding entry from its rule lookup table 414.

In addition to responding to rule set modification signals, the rule set manager 412 receives and processes rule set retrieval requests from the rule lookup module 404 shown in FIG. 4. When it receives such requests, the rule set manager 412 searches the lookup table 414 to locate all of the rule sets associated with a particular retrieval key (user ID) specified in the rule set retrieval requests. Each entry of the lookup table 414 that has a retrieval key matching the one specified in the retrieval request identifies an applicable rule set that the rule set manager 412 retrieves from the rule set database 104 and provides to the rule lookup module 404.

Returning to FIG. 4, for each of the rule sets so retrieved, the rule and event preparation module 406 prepares a working version of the rule set that includes the rules from the rule set and the event data values from the event record, transformed into a form that can be processed by the rule processor 420. This working version is referred to as an evaluation context. Such transformation may include converting the event data values into facts in a fact-representation format that is understood by an inference engine type of rule processor 420. The evaluation context is received by the rule processor interface 410, which takes the steps necessary to provide the evaluation context to the rule processor 420 for rule evaluation and then waits for a rule evaluation to complete.

Rule processing module 420 evaluates the rules in the evaluation context based on the transformed event data in the evaluation context using any of a variety of techniques. In the exemplary embodiment of the present invention, the rule processing module 420 is an inference engine type of rule processor which operates in a similar manner to such inference engines as CLIPS and Jess, both of which are well known in the art and publicly available. In such an inference engine type of rule processor, the rule evaluation occurs in the context of a working memory, the working memory containing rules to be evaluated and a collection of data ("facts") that are known to be true. The evaluation context prepared by the rule processor interface 410 may be an initialized copy of such a working memory. Each rule in the working memory is of the general form "IF <condition>, THEN <conclusion>" in which the "IF <condition>" tests for the existence of matching facts, and the "THEN <conclusion>" contributes new facts to the collection of facts in the working memory.

In the most basic implementation of an inference engine, the inference engine evaluates each rule of the rule set in turn, determines for each rule if the engine currently has facts in its fact sets which match the "IF <condition>" part of the rule. If such fact sets match the "IF <condition>" part, the inferencing engine adds new facts to its collection of facts, for use in evaluating subsequent "If <condition>" parts of subsequent rules. This evaluation process continues until the evaluation of all of the rules in the working memory ceases to derive new output values for "THEN <conclusion>" parts. The previous description is exemplary only, more sophisticated implementations are also possible that, for example, reorder the rules for more efficient evaluation or perform more efficient matching when testing the "IF <condition>" of a rule.

In the exemplary embodiment of the present invention, a result of the evaluation by the rule processor 420 may be that certain conclusions are drawn indicating that corresponding actions may be taken. The rule processor interface 410 receives the "now evaluated" evaluation context back from the rule processor 420 and provides the evaluation context to the action launcher 414 of the event processing controller 400. The action launcher 414 examines the evaluation context processed by the rule processor 420 to determine if such conclusions have been drawn, and if so, initiates execution of those actions by sending a perform-action signal over line 130 to the agent framework 108. This signal also includes an identification of the action to be performed.

Returning to FIG. 3A, the agent framework 108 includes, in addition to the elements previously described, a list 310 of the action performing modules present in the system 100. Each entry 312 of this list includes some identifier of the action performing module and also its location in memory. Responsive to a perform-action signal received over line 130, the agent framework 108 uses information in the perform-action signal to search the list 310 of action performing modules for one that is capable of performing the requested action, and then forwards the request to the selected action performing module 114 by sending a signal over line 132.

In the exemplary embodiment, the event record contains a single selection key indicating the user for which the event was generated. Certain events are to be processed on behalf of more than one user. This is accomplished by a particular one of the event generating modules 106 creating multiple event records and issuing multiple new-event signals, one for each such user. In an alternative embodiment, the event record may be extended to contain multiple selection keys, and the particular one of event generating modules 106 may create one event record containing the user IDs of all of the users. In such an alternative embodiment, processing such an event record by one of the event processing modules 110 may be performed by rule set lookup, and then preparation and evaluation for all of the user IDs specified as selection key values in the event record.

Thus, the exemplary embodiment of the present invention allows an intelligent agent to process events and perform actions on behalf of multiple users simultaneously, while permitting each user to specify the events to be processed, conditions to be evaluated and actions to be taken independently of other users for which the intelligent agent is also processing events.

Coordination of Changing Rule Sets and Events

As was previously described, the agent framework 108 receives from the agent management module 102 change request signals requesting that the agent change the way in which it is processing events for a user, by adding, replacing or deleting the data used by the event generation modules 106 to generate requested events as well as the data used to configure the event processing modules 110 as to how to process the events. These requests are handled by the change coordination function 320 of the agent framework 108 shown in FIG. 3. Because the configuration data for the event generating modules 106 and the rule sets for the event processing modules 110 are logically interrelated, the process of changing the data being used by these modules is preferably coordinated with the generation and processing of events.

As an example of the interrelationship, one piece of the data received by the agent framework 108 may be to request that a time-monitoring event generating module 106 should generate an event for user Alice, identified as "EVENT A" at 12:00PM on each day. The other part of the data received by the agent framework 108 is a rule set for an event processing module 110 which specifies that when an event identified as "EVENT A" is received, the result should be to delete some particular file "FILE B". With such an interrelationship, the event generating module 108 should not be permitted to generate an event identified as "EVENT A" for Alice until the event processing module 110 has received and made active the rules that determine the manner in which the event is processed. As a further illustration of the need for synchronization, in one case, some event generating module 108 may be configured to generate a conceptually different event for user Alice with the same identifier "EVENT A". In such a situation, if the event generation module 108 were permitted to continue to generate events based on prior configuration information, the result might be that the agent may delete "FILE B" at the occurrence of the conceptually old, rather than new, "EVENT A".

Figure 3B:
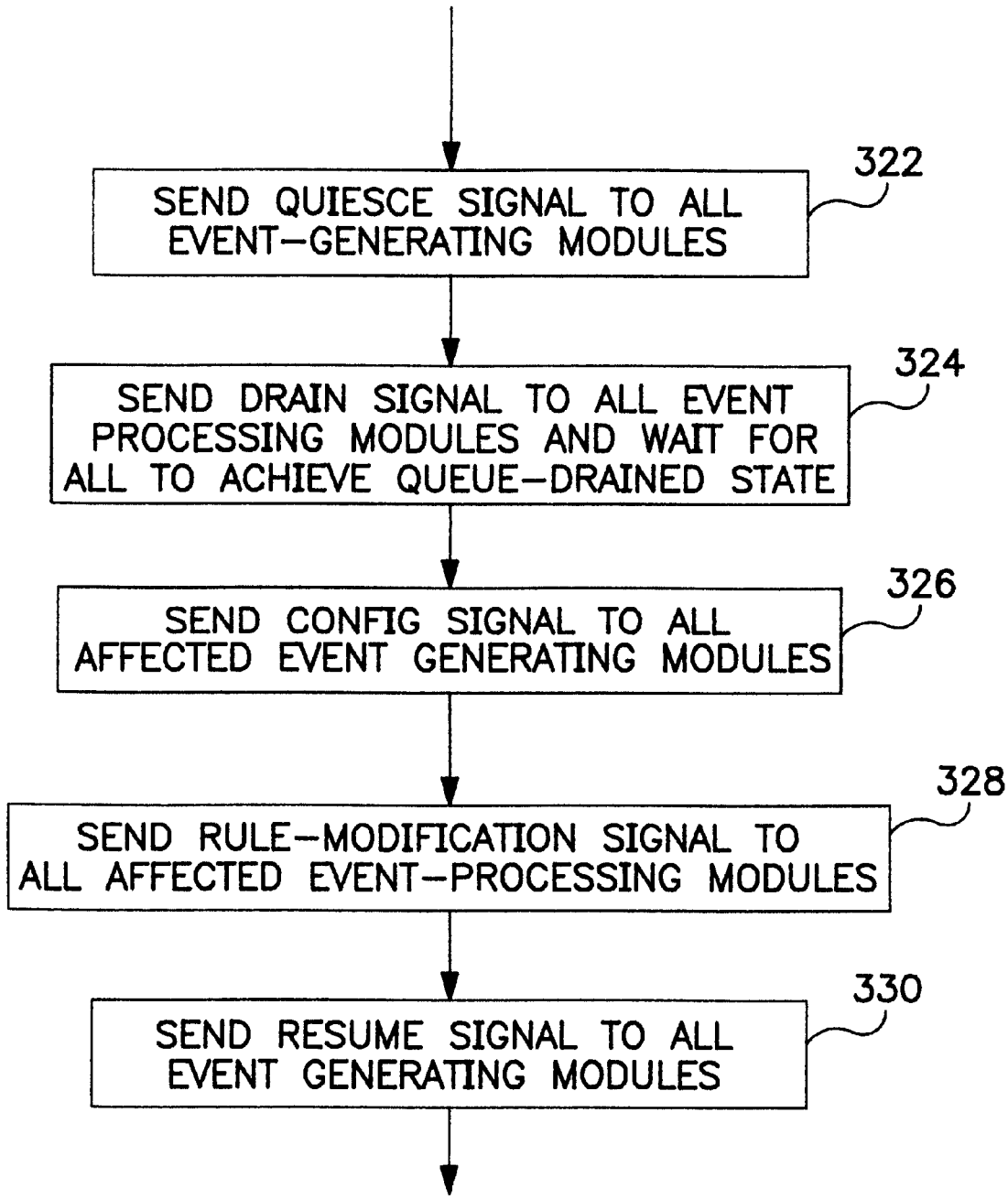
FIG. 3B is a flow-chart diagram depicting an embodiment of the change coordination function processing within the agent framework module of FIG. 3.

FIG. 3B is a flow-chart diagram depicting the steps of the change coordination function 320 to effect a change request received from the agent management module 102. Responsive to the change request signal, the change coordination function 320 receives a change request from the agent management module 102 that includes within it an identification of the user on behalf of whom the change is being made (user ID), a collection of configuration data used to instruct the event generating modules 106 as to how to generate events for this user, and rule sets used to instruct event processing modules 108 how to process the generated events.

The configuration data used to configure each of the event generating modules 106 includes a collection of configuration statements, each identifying the particular event generating module 106 for which it is intended, plus the operation to be performed by that module. For example, a statement may be directed to the event-generation module related to time keeping, to establish a recurring event that is generated at 12:00AM every day. Similarly, the rule set includes a collection of rule-set modification statements, each specifying the particular event processing module 108 for which it is intended, a label or identifier for a particular rule set (so that it can be referred to on subsequent requests), an operation code indicating whether the rule set is being added, changed, or deleted, and finally, for add and change requests, the updated or additional rules that comprise the new rule set.

After receiving the change request, the change coordinator function 320 of FIG. 3A causes the system 100 to temporary stop generating and processing events on behalf of the user associated with the user ID specified in the change request. Referring to FIG. 3B, at block 322, the change coordinator function 320 accesses the list 302 of event generation modules 106 present in the system 100 (shown in FIG. 3) and sends the quiesce signal to each event generation module included in that list over line 121. The quiesce signal includes within it an identification key which is specified as the same user ID value provided to the change coordination function 320. As previously described, the corresponding one of the event generation modules 106 stops generating events for the user identified by the selection key when provided this quiesce signal.

After block 322, the change coordination function 320 completes establishing a condition that no new events are to be generated for the effected user identified by the user ID. However, previously generated and not yet completed processing of generated events may still exist in the system 100 ("in-progress" events). For example, generated events waiting to be processed may be in an event queue of an event processing module 110. Thus, at block 324, the change coordination function 320 waits until there are no more in-progress events in the system 100 for the affected user. The wait is accomplished by the change coordinator function 320 which accesses the list 306 of event processing modules 110 present in the system 100 (shown in FIG. 3A) and sends a drain signal to each event processing module 110 included in that list over line 126. The drain signal includes a selection key specifying the same user ID value that was given to the change coordination function 320.

Returning to FIG. 4, an event processing module 110 includes within it a queue control module 408 that receives the drain signal sent by the change coordination function 320. Responsive to this signal, the queue control module 408 monitors the event queue 402 and also the current event being processed by the event processing controller 400 to determine the point in time at which the event processing module 110 no longer has any events in-queue or being processed for the selection key specified in the quiesce signal. When it has determined that there are no such events, the queue control module 408 responds to the change coordination function 320 with an acknowledgment signal indicating that it has completed the drain request and is now in a queue-drained state for the particular selection key.

The change coordination function 320 waits until all of the event processing modules 110 respond with acknowledgment signals indicating that they are in the queue-drained state for the particular selection key. When this occurs the change coordination function 320 has completed establishing the condition that the system 100 has temporarily suspended the generation and processing of events for the effected user.

Returning to FIG. 3B, at block 326, the change coordination function 320 sends to each affected event generation module 106 its portion of the configuration data specified in the change request signal received by the change coordination function 320 from the agent management module 124. The signal includes within it the user ID that was provided in the change request signal. As previously described, a corresponding one of the event generating modules 106 uses this information contained in the signal to establish the conditions under which the one module generates events, and records sufficient information to associate those events with the user ID specified in the signal.

Next, at block 328, the change coordination function 320 sends to each affected event processing module 110 its portion of the rule set data specified in the change request signal received by the change coordination function 320 from the agent management module 124. The signal includes within it the user ID that was provided in the change request signal. As was previously described, responsive to receiving this signal, the corresponding one of the event processing modules 106 uses this information to add, change or delete, the rule sets used to process events generated for the affected user, including recording sufficient information to associate those rule sets with the user ID specified in the signal.

Having thus completed the distribution of configuration information and rules on behalf of the user, the system 100 may resume generating and processing events on behalf of the user. Accordingly, at block 330, the change coordination function 320 accesses the list 302 of event generation modules 106 present in the system 100 (shown in FIG. 3A) and sends a resume signal to each event generation module included in that list over line 121. The resume signal includes within it a selection key which is specified as the same user ID value provided to the change coordination function 320 and that was used specified in the quiesce signal provided at block 322. As has been previously described, an event generation module 106 receives this signal, and responsive to this signal takes those steps necessary to resume generating events for the user identified by the selection key.

In the exemplary embodiment of the present invention thus far described, the instructions received by the agent framework 108 in change request signals consists of two separate sets of data, and the agent framework 108 separates these two sets of data and provides a first set to the event generating modules 106 as configuration signals, and the second set to event processing modules 110 as rule set modification signals. In an alternative embodiment, the instructions received in the change request signals consists solely of rule set information to be provided to event processing modules 110. In this alternative embodiment, the rule sets may be considered to have two classes of rules: configuration rules, and processing rules.

The processing rules are of the same general form as rules previously described and used in the processing of normally generated events by event generation modules 106. The configuration rules are rules that are of the same form as processing rules, and are distinguished only in that they are used to process special configuration events rather than normal events. The actions associated with evaluating these configuration rules and reaching action related conclusions are also provided by the action performing modules 114, via the agent framework 108.

Figure 3C:
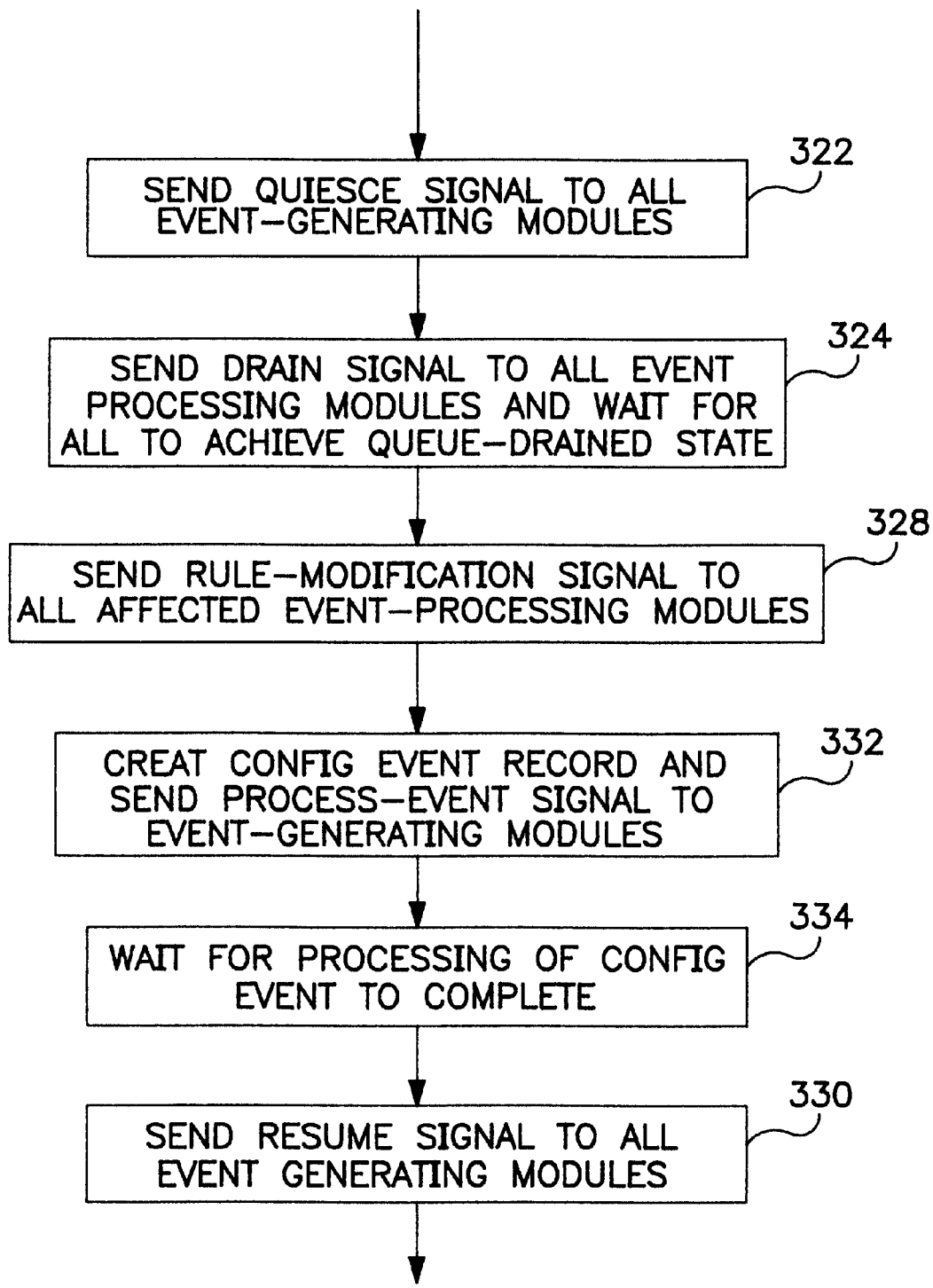
FIG. 3C is a flow-chart diagram depicting an alternative embodiment of the change coordination function processing within the agent framework module of FIG. 3.

FIG. 3C is a block diagram illustrating the change coordination function as performed in the alternative embodiment of the present invention. As shown, the process of temporarily stopping the system 100 from generating and processing events for a user at blocks 322 and 324 is the same as previously described with respect to FIG. 3B. Also, at block 328, the change coordination function 320 provides to the affected event processing modules 110 the rule set information in the same manner as was previously described with respect to FIG. 3B.

Referring to FIG. 3C, at block 332, the change coordination function 320, creates an event record for a special configuration event that is recognized by distinct event data values, such as a special event ID. The selection key in this event record is set to be the user ID provided in the change-request signal sent to the change coordination function 320. The change coordination function 320 then provides the configuration event record to either the event processing modules 110 to which rule set change signals were sent at block 328, or alternatively, to all processing modules 110 in the system 100.

At block 334, the change coordination function 320 then waits for the processing modules 110 to process this configuration event; one way to accomplish this waiting at block 334 is to send drain signals to all of the affected processing modules 110 and wait for them to respond to those signals. The system 100 may alternatively include other methods to wait until the processing of a specific event is completed.

With the processing of the special configuration event completed, at block 330 the change coordination function 320 signals all of the event generation modules 106 to resume generating events for the user, in the manner previously described.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of operating a rule-based intelligent agent that processes events occurring in a computer system on behalf of a plurality of users simultaneously, the method comprising the steps of:

receiving at least one event set and rule set for each of the plurality of users;

associating, with each event set and each rule set, a unique respective selection key which identifies the rule set and the event set with the respective user;

monitoring the computer system to detect occurrences of event conditions, wherein each detected event condition corresponds to an event specified in at least one of the received event sets;

assigning at least one selection key to each detected event condition, each assigned selection key corresponding to the at least one specified event of the received event sets; and processing each of the detected event conditions simultaneously using at least one rule set having a respective selection key which matches the selection key assigned to the event condition.

2. The method of operating the rule-based intelligent agent as recited in claim 1, wherein each event set and rule set has a respective label; the method further comprising the steps of:

receiving, from at least one user, a request, wherein each request includes at least one of an associated specified selection key, an event set label and a rule set label;

modifying the operation of the monitoring step to suspend detection of the occurrence of any event condition which corresponds to the specified selection key of the request if present while continuing to detect the occurrences of event conditions that do not correspond to the specified selection key of the request;

altering operation of the rule-based intelligent agent according to the request based on at least one of the selection key, event set label and rule set label of which match the specified selection key, event set label and rule set label of the request; and resuming the operation of the monitoring step to detect occurrences of the event conditions having the specified selection key.

3. The method of operating the rule-based intelligent agent as recited in claim 2, wherein the request is an add request and the add request further includes at least one new event set and new rule set, the method further comprising the steps of:

associating, with each new event set and each new rule set, a respective selection key which identifies the rule set and the event set with the respective user, and wherein the monitoring step monitors the computer system to detect an occurrence of an event condition corresponding to an event specified in at least one new event set; the assigning step assigns the respective selection key to the detected event condition; and the processing step processes the detected event condition using the at least one new rule set having the respective selection key which matches the selection key assigned to the event condition.

4. The method of operating the rule-based intelligent agent as recited in claim 2, wherein the request is a modify request having the specified selection key, and the modify request further includes at least one of an event set instruction and rule set instruction, the method further comprising the steps of:

modifying, according to the event set instruction and the rule set instruction of the modify request, each event set and each rule having the selection key, event set label and rule set label of which match the specified selection key, event set label and rule set label of the modify request, and wherein the resuming step resumes detection of occurrences of the event conditions having the specified selection key, the monitoring step detects an occurrence of an event condition corresponding to an event of the modified event set, and the processing step processes the detected event condition using the modified rule set.

5. The method of operating the rule-based intelligent agent as recited in claim 4, wherein the event set instruction includes a replacement event set and the rule set instruction includes a replacement rule set, the resuming step resumes detection of occurrences of the event conditions having the specified selection key, the monitoring step detects an occurrence of an event condition corresponding to an event of the replacement event set, and the processing step processes the detected event condition using the replacement rule set.

6. The method of operating the rule-based intelligent agent as recited in claim 2, wherein the request is a delete request having the specified selection key, the method further comprising the steps of:

deleting each event set and each rule set having the selection key, event set label and rule set label of which match the specified selection key, event set label and rule set label of the delete request, and wherein the resuming step resumes detection of occurrences of the event conditions having the specified selection key, but the monitoring step no longer detects an occurrence of an event condition corresponding to an event of each deleted event set, and the processing step no longer processes the detected event condition using each deleted rule set.

7. The method of operating the rule-based intelligent agent as recited in claim 2, wherein the suspending step further comprises the steps of:

determining whether at least one event condition has previously been detected but for which the processing has not yet been completed, the selection key of which matches the specified selection key of the modification request; and completing the processing of each currently processed event condition while disabling the processing of any new event condition matching the specified selection key.

8. The method of operating the rule-based intelligent agent as recited in claim 7, wherein:

the processing step provides at least one other event condition based on the detected event condition, and the suspending step further comprises the steps of:

determining, for each processed, event condition having a selection key matching the selection key of the request, whether the one other event condition is to be generated by the processing step which processes the detected event condition according to the corresponding rule set having the respective selection key; and disabling the operation of the monitoring step so as to not detect the occurrence of an event having the respective selection key of the request which matches the selection key of the one other event condition.

9. The method of operating the rule-based intelligent agent as recited in claim 8, wherein the disabling step includes the steps of (1) determining whether at least one event condition is currently being processed corresponding to the other event condition and having the respective selection key matching the selection key of the request, and (2) if so, completing the processing of the currently processed event condition while disabling the processing of each new event condition matching the other event condition.

10. The method of operating the rule-based intelligent agent as recited in claim 1; further comprising the steps of storing each received event set with the corresponding selection key and storing each received rule set with its corresponding selection key.

11. The method of operating the rule-based intelligent agent as recited in claim 1, wherein the monitoring step provides an event record which includes event condition data, an event identifier (ID) defining the at least one event of the received event sets which matches the event condition and the corresponding selection key, and the processing step includes the steps of receiving the event record; applying an algorithm to the event condition data as specified by the rule set corresponding to the event ID, the selection key of which rule set matches the selection key of the event record; and providing an action corresponding to the identified event ID for the user associated with the corresponding selection key.

12. A method of operating a rule-based intelligent agent that processes events occurring in a computer system on behalf of a plurality of users simultaneously, the method comprising the steps of:

receiving at least one rule set for each of the plurality of users, each rule set including a configuration instruction associating selected ones of the rule set with at least one corresponding event of an event set;

associating, with each rule set, a unique respective selection key which identifies the rule set and each corresponding event with the respective user;

monitoring the computer system to detect occurrences of event conditions, wherein each detected event condition corresponds to at least one event of the received rule sets;

assigning at least one selection key to each detected event condition, each assigned selection key corresponding to the respective selection key of the at least one event of the received rule sets; and processing each of the detected event conditions simultaneously using the selected ones of the rule set associated with the event of each rule set having a selection key which matches the selection key assigned to the event condition.

13. The method of operating the rule-based intelligent agent as recited in claim 12, wherein each rule set includes a respective rule set label, the method further comprising the steps of:

receiving, from at least one user, a modification request associated with a specified selection key, the modification request including at least one modified rule set having a corresponding modified configuration instruction and a respective label and each associated with the specified selection key;

modifying the operation of the monitoring step to suspend detection of the occurrence of any event condition having a respective selection key which matches the specified selection key;

substituting the modified rule set and corresponding modified configuration instruction for each rule set and configuration instruction, the selection key and respective label of which match the specified selection key and respective label of the modified rule set of the modification request; and resuming the operation of the monitoring step to detect occurrences of the event conditions having the specified selection key.

14. The method of operating the rule-based intelligent agent as recited in claim 13, wherein the modifying step further comprises the steps of:

determining whether at least one event condition has previously been detected but for which the processing has not yet been completed, the selection key of which matches the specified selection key of the modification request; and completing the processing of each currently processed event condition while disabling the processing of any new event condition matching the specified selection key.

15. The method of operating the rule-based intelligent agent as recited in claim 14, wherein:

the processing step provides at least one other event condition based on the detected event condition, and the suspending step further comprises the steps of:

determining, for each processed and detected event condition having a selection key matching the selection key of the modification request, whether the at least one other event condition is to be generated by the processing step which processes the detected event condition according to the corresponding rule set having the respective selection key; and disabling the operation of the monitoring step so as to not detect the occurrence of an event which corresponds to the at least one other event condition having the respective selection key which matches the selection key of the modification request.

16. The method of operating the rule-based intelligent agent as recited in claim 15, wherein the disabling step includes the steps of (1) determining whether an event condition is currently being processed corresponding to the other event condition and having the respective selection key matching the selection key of the modification request, and (2) if so, completing the processing of the currently processed event condition while disabling the processing of a new event condition matching the other event condition.

17. The method of operating the rule-based intelligent agent as recited in claim 15, wherein:

the disabling step includes the steps of determining whether a plurality of other detected event conditions, each having a respective selection key matching the selection key of the modification request, are currently being processed, and if so, completes processing of the plurality of currently processed event conditions while disabling the processing of a new event condition matching the other event condition.

18. The method of operating the rule-based intelligent agent as recited in claim 12, wherein each rule set includes a respective rule set label, the method further comprising the steps of:

receiving, from at least one user, a delete request associated with a specified selection key, the delete request including at least one of a deleted rule set label and a deleted configuration instruction;

modifying the operation of the monitoring step to suspend detection of the occurrence of any event condition having a respective selection key which matches the specified selection key; and deleting 1) each rule set having the specified selection key and rule set label corresponding to the deleted rule set label of the delete request and 2) each configuration instruction having the specified selection key and rule set label corresponding to the deleted configuration instruction of the delete request.

19. The method of operating the rule-based intelligent agent as recited in claim 18, wherein:

the processing step provides at least one other event condition based on the detected event condition, and the suspending step further comprises the steps of:

determining, for each processed and detected event condition having a selection key matching the selection key of the delete request, whether the one other event condition is to be generated by the processing step which processes the detected event condition according to the corresponding rule set having the respective selection key; and disabling the operation of the monitoring step so as to not detect the occurrence of an event which corresponds to the at least one other event condition having the respective selection key which matches the selection key of the delete request.

20. The method of operating the rule-based intelligent agent as recited in claim 19, wherein the disabling step includes the steps of (1) determining whether an event condition is currently being processed corresponding to the other event condition and having the respective selection key matching the selection key of the delete request, and (2) if so, completing the processing of the currently processed event condition while disabling the processing of a new event condition matching the other event condition.

21. The method of operating the rule-based intelligent agent as recited in claim 19, wherein the disabling step includes the steps of determining whether a plurality of other detected event conditions, each having a respective selection key matching the selection key of the delete request, are currently being processed, and if so, completes processing of the plurality of currently processed event conditions while disabling the processing of a new event condition matching the other event condition.

22. The method of operating the rule-based intelligent agent as recited in claim 18; wherein the modifying step further comprises the steps of:

determining whether at least one event condition is currently being processed, the selection key of which matches the specified selection key of the modification request; and completing the processing of each currently processed event condition while disabling the processing of any new event condition matching the specified selection key.

23. The method of operating the rule-based intelligent agent as recited in claim 12; further including the steps of:

receiving an add request from one user, the add request including at least one new rule set having a corresponding new configuration instruction; and associating with the at least one new rule set and corresponding new configuration instruction the respective selection key identifying the one user;

wherein the received new rule set and corresponding new configuration instruction with the corresponding selection key are available to the monitoring and processing steps respectively.

24. A processor for operating a rule-based intelligent agent that processes events occurring in a computer network on behalf of a plurality of users simultaneously, the processor comprising:

receiving means for receiving at least one event set and rule set for each of the plurality of users;

associating means for associating, with each event set and each rule set, a unique respective selection key which identifies the rule set and the event set with the respective user;

monitoring means for monitoring the computer system to detect occurrences of event conditions, wherein each detected event condition corresponds to an event specified in at least one of the received event sets;

assigning means for assigning at least one selection key to the event condition, the assigned selection key corresponding to the specified event of the received event sets; and processing means for processing each of the detected event conditions simultaneously using at least one rule set associated with the selection key which matches the selection key assigned to the detected event condition.

25. The processor for operating the rule-based intelligent agent as recited in claim 24, wherein each event set and rule set has a respective label; further comprising:

means for receiving, from at least one user, a request, each request including at least one of an associated specified selection key, an event set label and a rule set label;

means for suspending detection by the monitoring means of the occurrence of any event condition which corresponds to the specified selection key of the request if present, while continuing to detect the occurrences of event conditions that do not correspond to the specified selection key of the request;

altering means for altering operation of the rule-based intelligent agent according to the request based on at least one of the selection key, event set label and rule set label of which match the specified selection key, event set label and rule set label of the request; and means for resuming the operation of the monitoring means to detect occurrences of the event conditions having the specified selection key.

26. The processor for operating the rule-based intelligent agent as recited in claim 25, wherein the request is selected from the group consisting of an add request corresponding to an addition of at least one of an event set and rule set having a respective selection key, a delete request corresponding to a deletion of at least one of an event set and rule set of which the respective selection key match the specified selection key, and a modify request corresponding to a modification of at least one of an event set and rule set of which the respective selection key match the specified selection key.

* * * * *